June 29, 1954 — C. E. PURVIS — 2,682,269
THRESHING MACHINE FOR PEAS AND BEANS
Filed Nov. 3, 1950
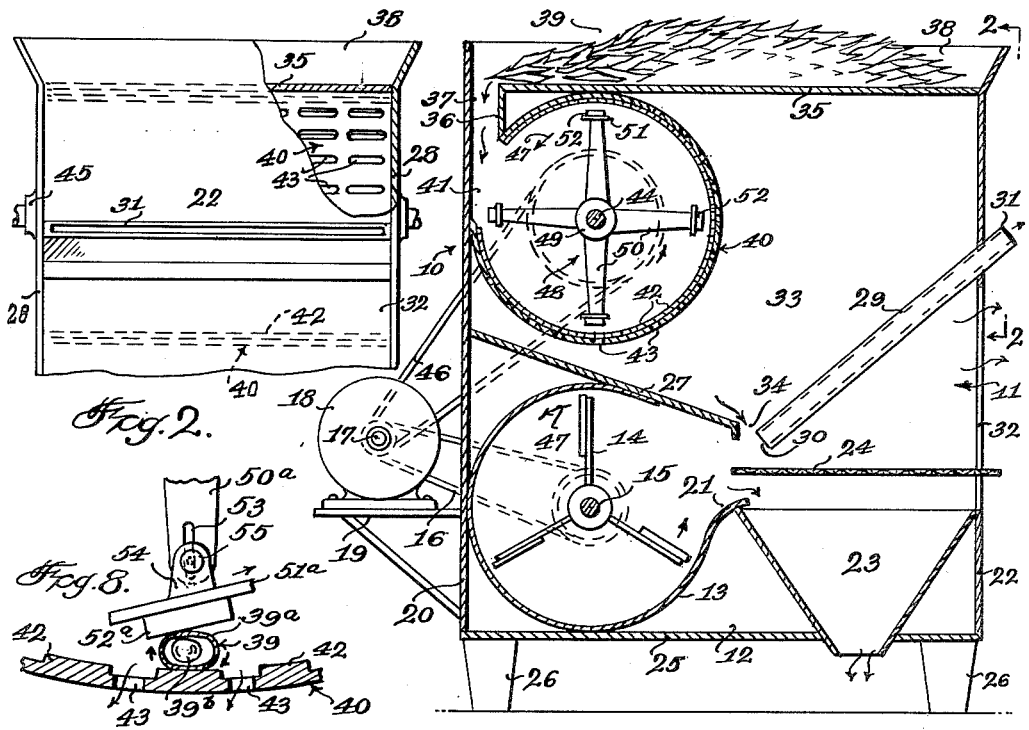
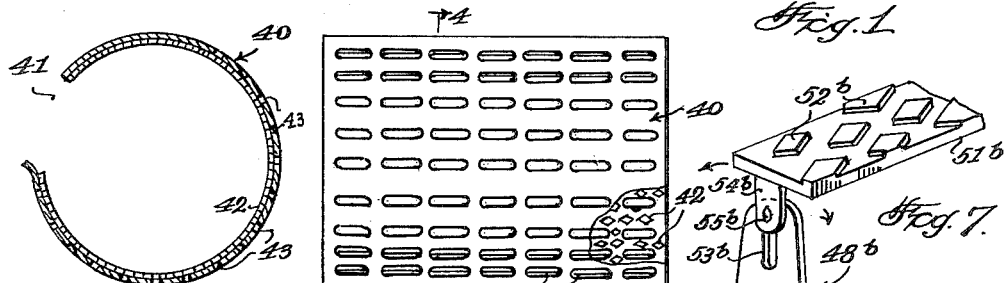
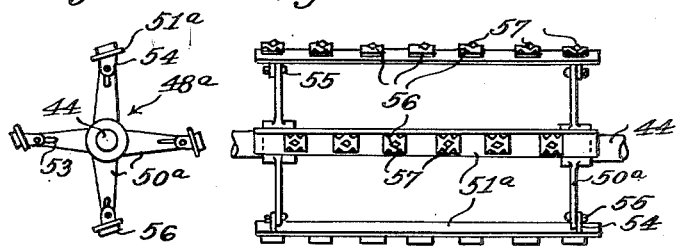
Inventor
CARROLL E. PURVIS
By John N. Randolph
Attorney

Patented June 29, 1954

2,682,269

UNITED STATES PATENT OFFICE 2,682,269

THRESHING MACHINE FOR PEAS AND BEANS

Carroll E. Purvis, Charing, Ga.

Application November 3, 1950, Serial No. 193,792

4 Claims. (Cl. 130—30)

This invention relates to a novel threshing machine for hauling picked peas and beans of substantially all types which will accomplish an efficient and complete hulling of the peas and beans by carrying them in a rotary motion through one or more revolutions of a rotating part of the machine until a complete hulling thereof has been accomplished and which is so constructed that the hulled beans or peas will not be mashed or otherwise damaged.

Another object of the invention is to provide a threshing machine which is so constructed that it will efficiently function to prevent the discharge of any beans or peas therefrom before the beans or peas have been completely hulled and wherein a rotating part of the apparatus is so constructed that an excess quantity of beans or peas may not become wedged in a position so that the mass will be mashed.

Various other objects and advantages of the invention will hereinafter become more fully apparent from the following description of the drawing, illustrating presently preferred embodiments thereof, and wherein:

Figure 1 is a vertical sectional view illustrating a preferred embodiment of the machine in vertical section and partly in side elevation;

Figure 2 is a fragmentary end elevational view, partly broken away, taken substantially along a plane as indicated by the line 2—2 of Figure 1;

Figure 3 is a side elevational view, partly broken away, of the thresher cylinder shown removed from the machine;

Figure 4 is a cross sectional view thereof taken substantially along a plane as indicated by the line 4—4 of Figure 3;

Figure 5 is an end elevational view of a slightly different form of beater unit than that disclosed in Figure 1;

Figure 6 is a side elevational view thereof;

Figure 7 is a fragmentary perspective view of a portion of a third form of beater unit, and Figure 8 is an enlarged fragmentary end elevational view, partly in section illustrating a part of the beater unit as shown in Figures 5 and 6 in its relationship to the hulling cylinder.

Referring more specifically to the drawing, the threshing machine in its entirety is designated generally 10 and includes a housing or casing, designated generally 11 having a bottom chamber 12 in which is secured a blower casing 13 containing a blower 14 one end of the drive shaft 15 of which projects outwardly beyond a side of the casing 11 and is adapted to be driven by a belt and pulley drive 16 from the drive shaft 17 of a motor 18. The motor 18 is supported on and fixedly secured to a bracket 19 which is secured to the casing 11 and projects from one end wall thereof. The blower casing 13 is disposed adjacent said end wall 20 of the casing 11 and between the upwardly inclined outlet 21 of said blower casing and the opposite end wall 22 of the casing 11 is disposed a funnel shaped discharge conduit 23 having an enlarged open upper end which is disposed beneath and adjacent a separator screen or sieve 24 and a restricted lower end which extends downwardly through and discharges below the level of the casing bottom 25. The casing 11 is supported in an elevated position by supporting legs 26 so that the restricted lower discharge end of the conduit 23 is disposed in an elevated position to enable a suitable receptacle for beans or peas to be placed thereneath.

The casing 11 is provided with a partition 27 which extends between the side walls 28 of the casing and inwardly from the end wall 20 to a point above and adjacent the inner edge of the screen 24 and said partition 27 is inclined downwardly and inwardly as seen in Figure 1. A conduit 29 of a width substantially equal to the distance between the side walls 28 is secured to said side walls and has an inlet end 30 disposed adjacent the lower inner end of the partition 27 and above and adjacent a portion of the screen 24. Said conduit 29 extends upwardly at an incline from its inlet end 30 in a direction away from the partition 27 and outwardly through the end wall 22 so that the upper, discharge end 31 of the conduit 29 is disposed externally of the casing 11. The end wall 22 is open from beneath and adjacent the conduit end 31 to or below the sieve or screen 24 as seen at 32. The partition 27 and conduit 29 combine to separate the bottom chamber 12 of the casing 11 from an upper chamber 33 of the casing and the space between the adjacent ends of the partition 27 and conduit 29 from a passage 34 between the chambers 33 and 12. The chamber 33 is substantially closed at its top by a top wall 35 which is spaced from the upper end of the casing 11 and which extends from side to side thereof and from the end wall 22 to adjacent the end wall 20 and which terminates adjacent said end wall 20 in a downward flange 36 which combines with the end wall 20 to form a vertical passage 37. The top wall 35 and the portions of the end walls 20 and 22 and side walls 28 which are disposed thereabove combine to form a shallow hopper 38 to receive the beans or peas as indicated at 39 to be hulled.

An interrupted hulling cylinder, designated generally 40, is disposed in the upper chamber 33 and is secured at its ends to the casing side walls 28 which close the cylinder ends. The upper portion of the cylinder 40 is disposed beneath and adjacent the top wall 35 and the bottom most portion of the cylinder 40 is disposed above and spaced from the partition 27. One edge of the cylinder 40 is secured to the bottom edge of the flange 36 and the opposite edge thereof is secured to the end wall 26 so that the gap or opening 41 of the cylinder 40 communicates with the lower end of the vertical passage 37 and as a result the passage 37 discharges only into the cylinder 40. The cylinder 40 which is preferably formed of metal has a smooth exterior surface and the interior surface thereof is provided with a series of spaced projections 42 over the entire area thereof, the individual projections of which may be of any desired shape and are disclosed as being substantially diamond shaped. The cylinder 40 with the projections 42 may be formed of a material commonly used for floors or steps and known as "floor plate." The cylinder 40 is provided with a series of elongated openings 43 which are formed therein between the projections 42 and which are disposed in longitudinal and circumferential rows. The openings 43 are arranged in rows longitudinally and circumferentially of the cylinder 40, as illustrated in Figure 3. The openings 43 are elongated longitudinally of the cylinder and are each preferably about one and one-quarter inches in length and approximately seven-sixteenths of an inch wide at its widest part, said openings preferably being oval shaped. The openings of each longitudinal row of openings are preferably spaced apart approximately a half inch. However, it is to be understood that the size of the openings may be varied. The openings 43 are preferably, but not necessarily, omitted from the portion of the cylinder 40 which is disposed adjacent the top wall 35 and flange 36.

A shaft 44 extends axially through the cylinder 40 and has portions thereof journalled in bearings 45 formed on the outer side of the side walls 28. One end of the shaft 44 is connected by a belt and pulley drive 46 to the motor shaft 17 so that both the blower 14 and the shaft 44 will be revolved in a counterclockwise direction as seen in Figure 1 and as indicated by the arrows 47.

A beater unit, designated generally 48, is fixed to the shaft 44 within the cylinder 40 and includes a pair of hubs 49 each of which is suitably fixed to the shaft 44 adjacent an end of the cylinder 40 and each hub 49 is provided with a plurality, preferably four spokes 50 which extend radially therefrom. The complementary, longitudinally aligned spokes 50 of the two hubs 49 are connected by bars 51 which extend to adjacent the end of the cylinder 40 and each bar 51 on its outer side is provided with a plurality of longitudinally spaced blocks 52 which are suitably secured thereto. The outer surfaces of the blocks 52 are spaced from the axis of the shaft 44 a distance to provide a slight clearance between the blocks 52 and the projections 42, which clearance is preferably of not more than one-half inch.

Assuming that the motor 18 is operating for revolving the blower 14 and beater units 48 counterclockwise as seen in Figure 1 and indicated by the arrows 47, the beans or peas 39 to be hulled are loaded into the hopper 38 from which they will be discharged by gravity through the passage 37 and cylinder opening 41 into the cylinder 40. The beater units 48 which are revolving at a relatively high rate of speed will carry the beans or peas 39 around the inner side of the cylinder 40 and with the peas escaping from the bars 51 of the beater units between the blocks 52 and the projections 42. Said blocks 52 passing over the beans will break the hulls to allow the beans or peas to escape therefrom but the blocks are spaced sufficiently from the projections 42 to prevent the beans or peas being crushed by this operation. The un-hulled beans or peas may be swept around the cylinder 40 a number of times by the bars 51 before the peas are completaely hulled after which the hulled peas or beans and empty hulls will escape through the openings 43 falling onto the partition 27 and being directed by gravity therefrom through the outlet 34. Here the beans or peas will be separated from the empty hulls due to the fact that the blast of air from the blower 14 will expel most of the hulls upwardly and outwardly of the casing 11 through the outlet conduit 29 while the heavier beans or peas will drop onto the sieve or screen 24 which is sized to permit them to escape therethrough into the outlet conduit 23 from which they will be discharged into any suitable container, not shown, below the casing bottom 25. Any empty hulls which escape the outlet conduit 29 will fall onto the screen 24 and being too large to pass through the openings thereof will be blown therefrom by the blast from the blower 14 out of the casing 11 through its opening 32. It will be noted that the beater assembly 48 does not provide a solid construction between the bars 51 and shaft 40 or between the adjacent bars 51 so that in the event that an excess amount of un-hulled beans or peas are being swept in advance of any of the bars 51 the excess thereof may escape therefrom over the inner sides of the bars thus preventing too large a quantity of beans or peas at any one time assuming a position between any of the bars 51 and the cylinder 40 and which might tend to crush the beans or peas.

Figures 5, 6 and 8 illustrate a slightly modified form of the beater unit, designated generally 48a, which differs from the unit 48 in that the radially extending spokes 50a are each provided adjacent its outer end with a radially elongated slot 53. The bars 51a instead of being fixed to the spokes, as in Figure 1, are provided with apertured lugs 54 which project from the inner sides thereof at an oblique angle to the plane of each bar and said lugs are secured to the spokes 50a by nut and bolt fastening 55. Accordingly, it will be noted that if the lugs 54 are disposed in alignment with the spokes 50a, the bars 51a will be disposed with their planes at an oblique angle to the axis of the spokes and with the leading edges of said bars closer to the axis of the shaft 44 than the trailing edges thereof. It will also be apparent that this tilted disposition of the bars 51a with respect to the spokes may be varied by clamping the lugs 54 to the spokes by the fastenings 55 at different angular positions. The bars 51a instead of being provided with the blocks 52 preferably each has secured to the outer side thereof a plurality of longitudinally spaced pieces of material corresponding to the material of which the cylinder 40 is formed forming blocks 52a each including a solid base portion 56 having one side suitably secured to the outer side of its bar 51a and an opposite, outer side provided with a plurality of projections 57, corresponding to the projections 42 and which function therewith for hulling the beans or peas 39. The outer surfaces of the blocks 52a, as defined by the surfaces of their projections 57, are disposed so that their leading edges are spaced approximately three-quarters of an inch from the surfaces of the projections 42 and so that their trailing edges are spaced approximately one-quarter of an inch from the surfaces of said projections 42, as clearly illustrated in Figure 8. Consequently, the hulls 39a of the beans or peas 39 will be subjected to an increasing crushing and rolling operation as the blocks 52a ride thereover; however, the trailing edges of said blocks 52a are spaced sufficiently from the projections 42a to prevent crushing or injury to the beans or peas 39b. In view of the detailed description of the operation of the machine as illustrated in Figure 1, a further description of the operation of the beater unit 48a is considered unnecessary.

Figure 7 illustrates still another modification of the beater unit, designated generally 48b, wherein the spokes 50b, correspond to the spokes 50a and are similarly connected by fastenings 55b to lugs 54b in the same manner that the lugs 54 are pivotally connected to the spokes 50a. In lieu of providing a bar with blocks which are secured thereto, as in Figure 1 or as the modification of Figures 5, 6 and 8, in the form of Figure 7 the bar 51b is formed of a strip of material corresponding with the material of which the cylinder 40 is formed, except that no openings 43 are provided therein. The projections 52b are disposed on the outer side of the bar 51b and constitute an integral part thereof. Additionally, the lugs 54b project perpendicularly from the plane of the bar 51b; however, the fastenings 55b enable the bar 51b to be positioned at an oblique angle to the axis of the spokes 50b or perpendicular thereto, so that the bar 51b can be disposed similar to the bar 51a, as illustrated in Figure 8. Additionally, in the form of Figure 7 and likewise in the form of Figures 5, 6 and 8 the fastenings 55 or 55b in combination with the slots 53 or 53b enable the bars 51a and 51b to be retracted or extended radially relatively to the spokes 50a and 50b to vary the spacing of said bars and their projections with respect to the projections 42 of the cylinder 40. It will likewise be understood that the structure as illustrated in Figure 7 is intended to be employed in conjunction with the cylinder 40 as shown in Figures 1, 3, 4 and 8.

Various other modifications and changes are likewise contemplated and may obviously be resorted to, without departing from the spirit or scope of the invention as hereinafter defined by the appended claims.

I claim as my invention:

1. In a threshing machine for beans and peas, an elongated horizontally disposed stationary cylinder, walls closing the ends of said cylinder, a driven shaft extending axially through the cylinder and journalled in said walls, said cylinder having an entrance opening above its horizontal center and below its top portion forming an entrance opening for beans and peas to be hulled, said cylinder being provided with a plurality of outlet openings each elongated in a direction longitudinally of the cylinder, a plurality of projections having substantially flat surfaces on the inner face of said cylinder disposed around and spaced from each outlet opening and separating said opening from outlet openings located adjacent thereto, said projections each being spaced an equal distance from the axis of the shaft, a plurality of said projections surrounding each of the outlet openings, and a beater unit fixed to the shaft and rotatable therewith within the cylinder including a plurality of fixed spokes projecting radially from the shaft adjacent each end of the cylinder, bars connected to the outer ends of said spokes, each of said bars being connected to two longitudinally aligned spokes, and each of said bars including an outer side provided with projections having substantially flat outer surfaces disposed approximately in opposed relation to the projections of the cylinder, and said bars having leading edges spaced a greater distance from the inner face of the cylinder than the trailing edges of said bars.

2. A machine as in claim 1, the walls closing the ends of said cylinder forming parts of a casing including a hopper disposed above the cylinder having a downwardly extending passage opening into the cylinder entrance opening, said entrance opening and passage each extending from end-to-end of the cylinder, said entrance opening having a bottom edge disposed in substantially the same horizontal plane as the axis of the shaft and an upper edge spaced substantially below the uppermost portion of the cylinder, and said beater unit being revolved in a direction whereby the bars thereof are movable downwardly across the entrance opening.

3. In a threshing machine for beans and peas, an elongated horizontally disposed stationary cylinder, walls closing the ends of said cylinder, a rotary driven shaft extending axially through the cylinder and journaled in said walls, said cylinder having an entrance opening above its horizontal center and below its top portion, said cylinder having a plurality of outlet openings each elongated in a direction longitudinally of the cylinder, and a beater unit fixed to the shaft and rotatable therewith within the cylinder and including a plurality of fixed spokes projecting radially from said shaft adjacent each end of the cylinder, bars connected to the outer ends of said spokes, each of said bars being connected to longitudinally aligned spokes, and said bars having leading edges spaced a greater distance from the inner face of the cylinder than the trailing edges of said bars.

4. In a threshing machine as in claim 3, and a plurality of projections on the inner face of said cylinder and on outer sides of the bars which are located adjacent said inner face of the cylinder, said projections of the cylinder and bars having substantially flat adjacently disposed surfaces.

References Cited in the file of this patent

UNITED STATES PATENTS

| Number | Name | Date |
|---|---|---|
| 212,763 | Sweatt | Feb. 25, 1879 |
| 496,206 | Placide | Apr. 25, 1893 |
| 590,560 | Atherton | Sept. 28, 1897 |
| 959,346 | Hummel | May 24, 1910 |
| 1,246,100 | Huston | Nov. 13, 1917 |
| 1,257,058 | Williams | Feb. 19, 1918 |
| 1,287,439 | Richmond | Dec. 10, 1918 |
| 2,048,345 | Lott | July 21, 1936 |
| 2,217,590 | Heth | Oct. 8, 1940 |

FOREIGN PATENTS

| Number | Country | Date |
|---|---|---|
| 201/26 | Australia | Apr. 19, 1927 |
| 569,989 | Germany | Feb. 10, 1933 |